United States Patent [19]

Forward

[11] 4,133,459

[45] Jan. 9, 1979

[54] DEFORMABLE TONER DISPENSER WITH FLOW RATE CONTROLLER

[75] Inventor: John E. Forward, Penfield, N.Y.

[73] Assignee: Xerox Corporation, Stamford, Conn.

[21] Appl. No.: 802,757

[22] Filed: Jun. 2, 1977

[51] Int. Cl.[2] .................... G01F 11/00; G01F 13/00

[52] U.S. Cl. .................................. 222/314; 118/308; 222/DIG. 1; 222/407

[58] Field of Search ................ 222/DIG. 1, 311-314, 222/316, 406, 407, 414; 118/DIG. 1, 308

[56] References Cited

U.S. PATENT DOCUMENTS

| | | | |
|---|---|---|---|
| 3,172,612 | 3/1965 | Besserdich | 118/308 X |
| 3,190,506 | 6/1965 | Selzler | 222/314 |
| 3,608,792 | 9/1971 | Hudson | 222/DIG. 1 |
| 3,631,800 | 1/1972 | Mignone et al. | 222/DIG. 1 UX |
| 3,898,956 | 8/1975 | Andrako | 118/7 X |

*Primary Examiner*—David A. Scherbel

[57] ABSTRACT

A toner dispenser having a resilient open-cell foam dispensing roll and a dispensing edge in deforming contact with the roll. The edge is both movable and contoured along the axis of the roll to vary both the toner dispensing rate and the uniformity of the dispensing rate along the edge.

7 Claims, 4 Drawing Figures

DEFORMABLE TONER DISPENSER WITH FLOW RATE CONTROLLER

BACKGROUND OF THE INVENTION

This invention relates to improvements in apparatus for dispensing finely divided powders or granular materials and, in particular, to improvements in xerographic toner dispensing apparatus.

More specifically, this invention relates to a xerographic toner container having dispensing means associated therewith that is particularly adapted for use in conjunction with a xerographic developing apparatus. Basically, in the art of xerography, an imaging member formed of a photoconductive surface carried on a conductive substrate is uniformly charged and the surface of the imaging member then exposed to a light image of an original which is to be copied. The photoconductive layer becomes conductive under the influence of the light image to selectively dissipate the charge found thereon thus forming a latent electrostatic image. To make this latent image visible, a finely divided pigmented resin-based material, commonly referred to as toner, is first charged to a potential opposite to that of the latent electrostatic image and then while still in a charged state, brought into contact with the latent image where the charged toner particles are attracted to the image where the charged toner particles are attracted to the image areas. The developer image is usually transferred from the plate surface to a final support material and fixed thereto to form a permanent record of the original.

The resin-based toners employed in the practice of the xerographic process are generally blended from finely subdivided materials to yield an extremely fine powder composition having an average particle size of about 10 microns. As used in most automatic xerographic reproducing apparatus, the fine toner particles are brought into rubbing contact with a triboelectrically remote and relatively coarser "carrier" material. The rubbing or mixing action causes the toner particles to become triboelectrically charged to a polarity opposite that of the carrier. The charged toner particles electrostatically coat themselves on the surface of the coarser carrier material and remain bonded there in a charged state. The two component material is then brought into contact with an image bearing photoconductive plate by one of several known techniques where the toner is electrostatically transferred from the carrier surface to the latent image areas to effect development. As can be seen, the coarser carrier particles not only provide a means for charging the toner material, but also provide a vehicle by which the toner particles are conveniently handled and transported in the xerographic development apparatus.

In order to sustain continuous operation in the automatic device, the toner material consumed in the development process must be periodically replaced within the development system. One arrangement for resupplying spent toner involves the use of a sealed toner cartridge or package which is placed into the xerographic machine when toner is depleted. The package usually includes a series of openings which are covered with an easily removable adhesive strip. The strip is removed from the package while maintaining the opening in the package at a 12 o'clock position. The package is then inserted into a receiving portion of the machine generally above the developer sump and rotated to bring the openings to the 6 o'clock position. This feeds the contents of the package into a dispensing hopper from whence a controllable amount of toner is periodically added to the development system in accordance with an error signal developed in accordance with well known techniques. The package is left in the machine until a new package is needed to fill the hopper.

Dispensing of toner from the hopper of the above described arrangement may be accomplished by means of a toner dispensing foam roll in accordance with U.S. Pat. No. 3,596,807 or Re27,876.

However, it has been found that the apparatus referred to in the above identified patents, while solving the problems heretofore associated with the prior art dispensing devices, has not proven entirely satisfactory for dispensing under all conditions.

More specifically, the foam roll of such toner dispensers is located to block an elongated opening in the dispenser housing, the opening spanning the width of developer housing. While such rolls have the outstanding characteristic of dispensing evenly across the width of the opening, it is sometimes desirable to dispense at a faster rate near the ends of the roll than at the central portion thereof. The above situation may typically be caused by the use of a toner cartridge which has a width greater than the width of the dispensing opening. When toner is dumped into the dispenser from such a cartridge, a greater head of toner is located above the ends of the dispensing roll. If left uncompensated, the low toner indicator located to sense the level of toner near the central portion of the dispenser would be activated prematurely (i.e. when a significant amount of toner was present in the dispenser above the ends of the roll).

In addition, to the general advantages of being able to control the uniformity of dispensing from a resilient open-cell roll dispenser, it is also desirable to control the rate at which dispensation takes place. Thus, when changes in toner material are effected, resulting in changes in dispenser rate, compensation for these effects may be made in a simple uncomplicated manner.

OBJECTS AND SUMMARY OF THE INVENTION

It is therefore a primary object of this invention to improve apparatus for handling and dispensing of finely divided particulate materials.

A further object of this invention is to improve automatic xerographic development apparatus providing an arrangement for controlling the uniformity of toner dispensed into a development housing.

Yet another object is to provide a toner dispensing mechanism which provides a mechanism for easily varying the rate of which toner is dispensed therefrom.

Yet another object is the provision of a toner dispenser which overcomes the disadvantages attendent to prior art dispensers.

These and other objects of the present invention are attained by means of a substantially enclosed dispensing hopper arranged to support a quantity of finely divided particulate material. The hopper is provided with an opening therein through which the material is dispensed by gravity to a developer sump. A foam roll dispensing roll is rotatably supported in the hopper in or adjacent the opening with the roll surface in biasing contact with interior wall surfaces of the container to form a movable seal for retaining particulate material within the hopper. The roll is formed of a resilient foamed elastomeric material having a textured outer surface with a plurality of open-cell cavities adapted to receive and support toner particles. Means are operatively connected to the dispensing roll to rotate it sequentially through the material in the hopper to load the open-celled cavities and then past at least one of the biasing surfaces wherein the surface of the roll is deformed sufficiently to cause toner thereon to be dispensed from the roll surface into the developer chamber.

The biasing surface, in accordance with the invention, is made movable toward and away from the foam roll to vary the rate at which toner is dispensed. In addition, the biasing surface is tapered such that the portions near the ends of the roll are in more forceful contact therewith to provide a greater dispensing rate near the ends of the roll.

BRIEF DESCRIPTION OF THE DRAWINGS

The novel features and advantages of the present invention will become more apparent after reading the following description which refers to the accompanying drawings wherein.

DESCRIPTION OF THE PREFERRED EMBODIMENT

Figure 1:
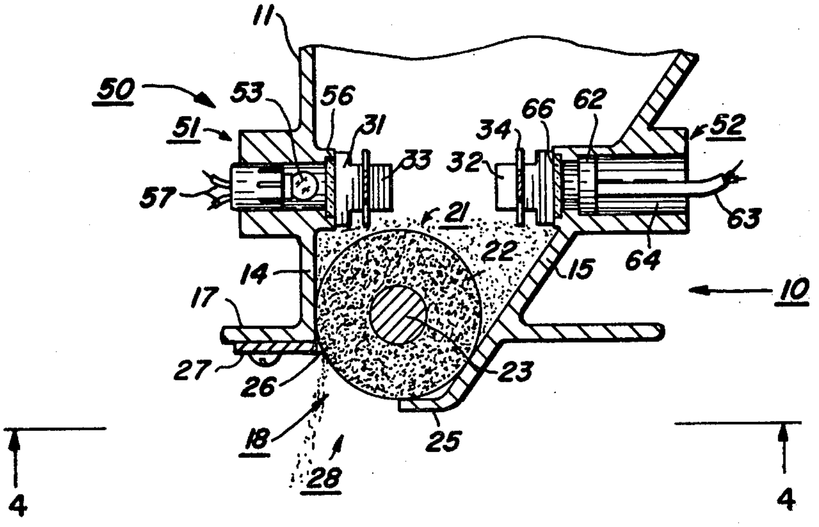
FIG. 1 is an elevation view taken generally on the lines 1—1 of FIG. 3 and showing the operation of the dispenser.
Figure 2:
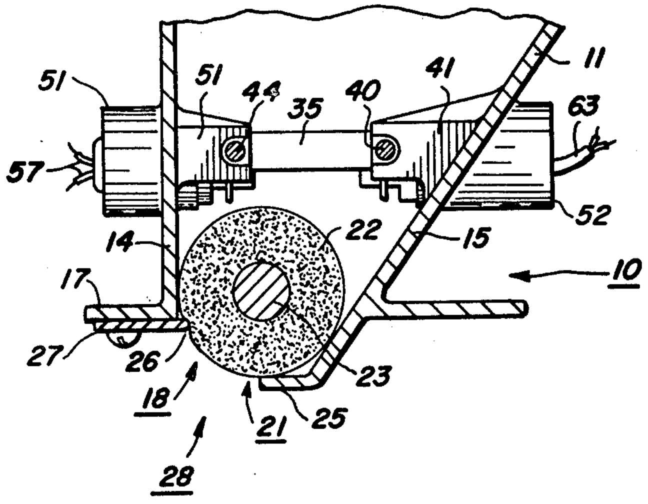
FIG. 2 is an elevation view taken generally along the lines 2—2 of FIG. 3.
Figure 3:
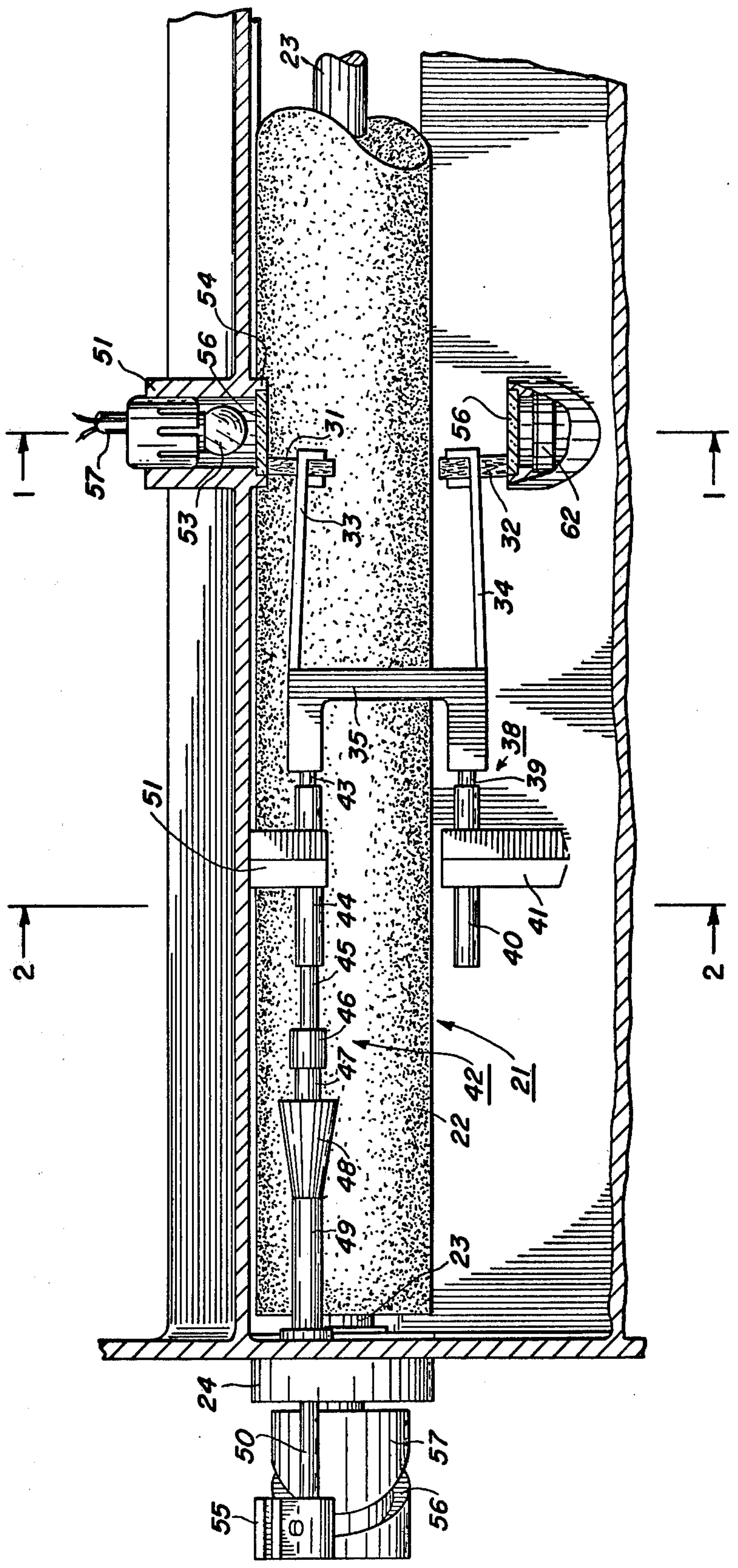
FIG. 3 is a plan view, partly in section, of the toner dispenser housing, and showing a photoelectric sensing arrangement incorporated thereinto.

The toner dispensing control of the invention will be described as being incorporated into a toner dispenser of the type generally shown in U.S. Pat. No. 3,596,807, although various other dispensing arrangements may be used in conjunction therewith. In addition, it is shown as incorporated into a dispenser having a low toner level indicator and wiper arrangement of concurrently filed application Ser. No. 802,748, in the joint names of J. Forward, G. Muller, and D. Connolly entitled Wiper Arrangement for Toner Level Sensor.

In order to set the environment into which the invention may be incorporated a brief description will be given of the aforementioned dispenser as follows:

Referring to the drawings, the toner dispensing unit 10 (only the dispenser opening portion shown) includes a hopper 11 having two sidewalls 14 and 15 closed by end walls (not shown) to form a generally four sided reservoir substantially triangular in cross section.

The bottom portions of the sidewalls 14 and 15 are spaced apart to form a dispensing opening 18 in the bottom of the hopper 11. The sidewall 15 is inclined to direct toner in the hopper by gravity toward the dispensing opening 18.

The dispensing unit 10 further includes a dispensing roll assembly 21 constructed in accordance with the teachings of aforementioned U.S. Pat. No. 3,596,807. The roll assembly 21 includes a cover 22 securely affixed to a shaft 23, as for example, by gluing, and the shaft is journaled for rotation in bearing blocks 24 (only one shown) provided in the lower end walls of the hopper 11. One end of shaft 23 extends through one end wall (not shown) of the hopper for coupling to a suitable drive means (not shown) to rotate the shaft 23.

The dispensing cover 22 may be formed from any number of foamed elastomeric materials having a textured open-celled surface structure made up of a mass of small hollow cavities capable of receiving and supporting a quantity of particulate material therein. Typical examples of foamable materials that can be formed in open-celled configurations are polyurethanes, polyvinyl chloride, silicones, polystyrenes, styrene acrylonitrile, cellulose acetate, and phenolics. A typical cover for use in the preferred embodiment of the present invention is one fabricated of a urethane foam.

The sidewalls 14 and 15 of the hopper 11 further form two flanges or bosses 25 and 26 which abut the periphery of the cover 22 to ensure uniform toner dispensing across the width of the developer housing. The trimmer boss 25 ensures that the pores of the foam roll cover which are filled during rotation through the toner do not carry an excessive amount of toner. The dispensing boss 26 applies pressure to the cover forcing the trapped dry ink to leave the roll and fall by gravity into the developer sump. The operation of the bosses 25 and 26 in deforming the surface of the roll cover to load and unload toner is described in greater detail in the aforementioned patent.

In operation, as the foam roll 21 is rotated, the toner in the hopper 11 is continuously loaded into the pores of the cover 22 on the hopper side of the roll, leveled by the trimmer boss 25, and forced to be expelled by baffle 26 on the developer sump side 28 of the roll.

The automatic toner level sensing arrangement 50 is located generally vertically above the roll assembly 21 and includes a light source or lamp unit 51 and a photocell assembly 52. The lamp assembly 51 includes a light source 53 which may be a conventional incandescent bulb or light emitting diode or the like. The light source 53 is held in a holder or socket 54 which is mounted in a suitable opening in the sidewall 14 of the hopper 11. The opening being covered on the inside by a light transmitting window 56. Suitable electrical leads 57 are coupled to the assembly 51 for energizing the source.

The photocell assembly 52 is mounted in the opposite sidewall 15 of the hopper at approximately the same vertical height as the lamp assembly 51 so that light from the source 53 may pass into the photocell assembly 52. The assembly 52 comprises a photosensor element 62 to which is coupled electrical leads 63. The photocell element is carried in a holder or socket 64 mounted in a suitable opening in the sidewall 15, the opening including a light transmissive window or shield 66 which closes the interior of the opening and separates the toner contained in the hopper from the element 62.

It is apparent that when toner in the hopper 11 rises to a level above the photocell and light assemblies, the light emitted by the source 53 will not be detected by the photocell element 63 due to blockage by the mass of toner in the hopper. However, when the toner level drops below that of the photocell and light assemblies the light from the lamp will pass unimpeded and activate the photocell which results in the generation of an electrical control signal indicative of the drop in toner below a preselected level. The electrical signal could, of course, be used to control the activation of a light or other visual indicator by which the operator would be informed of the need to replenish the toner in the machine.

Such low toner indicating assemblies of the prior art have the disadvantage that the windows 56 and 66 which operate to shield the lamp and photocell from contamination by toner, themselves become contaminated. This is an even more acute problem during high humidity conditions when toner tends to adhere to adjacent surfaces more easily. Under such conditions, the windows 56 and 66 may become darkened with toner to the extent that light from lamp 53 does not reach the photocell 62 even after the toner has dropped vertically below the level of the units. For the purpose of cleaning the windows 55 and 66 there is provided a wiper arrangement made up of wiper pads 31 and 32 associated with each of the transparent windows 56 and 66. The wiper arrangement is described in detail in the aforementioned copending application and only a brief description will be given here as follows. The pads 31 and 32 are made of any suitable soft rubber or plastic material which are sufficiently hard to remove toner material from the windows when wiped thereacross without excessive streaking. The pads 31 and 32 are mounted in resilient arms 33 and 34 respectively so that their wiping edges are parallel with the glass windows 56 and 66. The arms 33 and 34 are in partly loaded condition to exert a continuous force on the pads in the direction of the windows 56 and 66. This latter action fosters efficient cleaning of the windows.

The arms 33 and 34 are jointly carried by a U-shaped bracket 35. A first substantially rigid linkage assembly 38 comprising links 39 and 40 extends from the side of the U-shaped bracket 35 associated with arm 34. Link 40 is mounted for reciprocal movement in a bearing 41 fixed to side wall 15 of the dispenser hopper 11. A second substantially straight line rigid linkage assembly 42 is coupled to the side of the bracket 35 associated with the arm 33. Linkage assembly 42 comprises links 43–50. Link 44, in a manner similar to link 40, is mounted for reciprocal movement in a bearing 51 formed in the sidewall 14 of the dispenser housing.

The link 50 of the linkage assembly 42 is coupled to a follower 55 which rides in an endless groove 56 in the cam 57. The cam 57 is mounted for rotation with the dispensing roll shaft 23 so that as toner is dispensed the wiper arrangement operates continuously to clean the toner level indicator arrangement.

More specifically, as the toner dispenser roll shaft 23 rotates, so does cam 57 and groove 56. The groove 56 is generally circular but oriented in a plane inclined with respect to the perpendicular to the axis of the shaft. This configuration of the groove 56 operates to produce a back and forth movement of the follower 55 along the axis of the shaft in response to rotation of the shaft 23.

The reciprocating movement of the follower 55, during rotation of the cam 57 is transmitted by the linkage assemblies 42 and 43 the wipers which move in a back and forth manner across the surfaces of the windows to thereby clean toner from the windows by the level sensing arrangement.

In operation, when toner in the dispenser is above the level of the light transmitted from the source 53 to the photocell 62, the light is blocked and the photocell remains inactivated. During this time period the wipers 31 and 32 are reciprocated across the surfaces of the window elements even through this action is ineffective to clean the windows, due to the high toner level in the dispenser. When, however, toner in the dispenser drops below the level of this test light beam, the photocell "sees" the light beam and generates a control signal indicating a low toner level. If toner should temporarily fog either of the windows suring the time when the toner level is below the level of the beam, thereby preventing generation of the control signal, it is cleaned therefrom during the next rotation or operation of the toner dispenser shaft 23, the latter condition operating to move the wipers across the windows.

Figure 4:
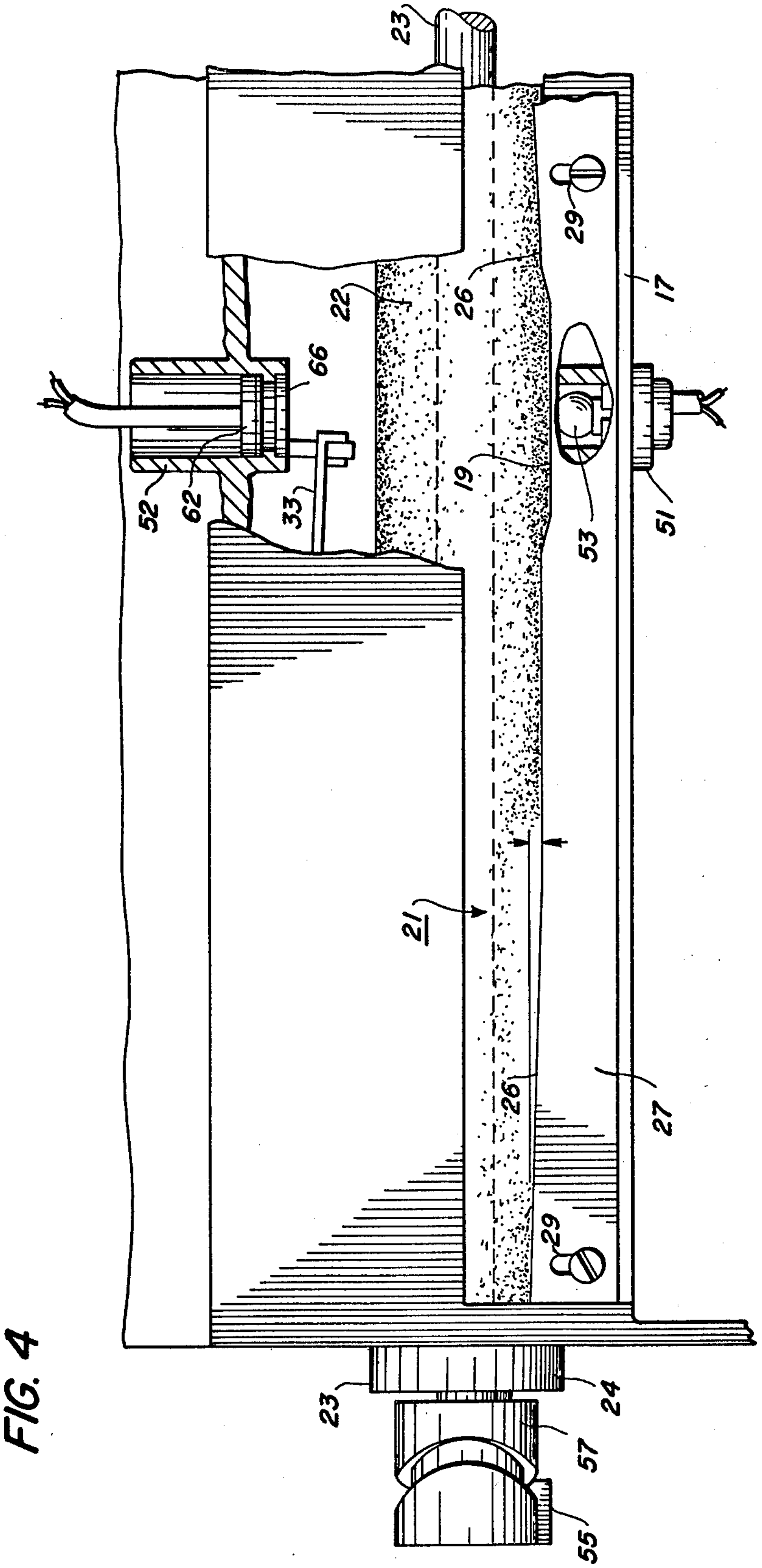
FIG. 4 is a bottom view showing the details of the tapered and movable dispensing boss of the invention.

Referring now to FIG. 4, the arrangement of the invention for controlling the uniformity and rate of dispensation of toner into the developer housing will be described.

The mechanism for controlling the rate of dispensation is based on the observation that, within limits, the dispensing rate of a foam roll dispenser of the type used herein and described in the aforementioned patents increases as the dispensing edge is brought into more forceful abutment with the roll 22 (closer to the shaft 23). More specifically, as the edge 26 more severely deforms the roll 22 it more completely empties the cavities on the foam roll of toner thereby increasing the flow of toner out of the roll.

For the purpose of controlling the rate at which toner flows out of the hopper the dispensing boss or edge 26 is formed on a wall 27 which is movable toward or away from the dispensing cover or roll 22. This may be done by providing suitable elongated slots 29 in the wall 27 and providing mating holes in the abuting support flange 29 of the hopper 21. A bolt or similar device is passed through the hole and slot and tightened as desired to establish the fixed position of the edge 26 in abutment with the cover 22.

Thus, the invention herein provides a convenient method of controlling the rate at which toner is dispensed from the hopper at any given rate of revolution of the roll 22.

In addition, the uniformity of rate across the width of the developer housing (along the axis of the roll 22) may be controlled by shaping the contour of the dispensing edge 26 in an appropriate manner. Thus, as shown in FIG. 4, the edge 26 is tapered (shown exaggerated for illustration) toward the central portion thereof thereby deforming the roll 22 to a greater extent near the ends of the roll than in the center. This contour results in a greater rate of toner dispensation near the ends of the roll than near the center.

As noted above, this specific tapered central portion contour for the dispensing edge 26 permits the level of toner in the hopper to fall more uniformly in the special case where it is initially loaded non-uniformly. This latter problem results, as discussed herein before, from the fact that toner is dumped into the hopper from a cartridge of greater length than the hopper.

It is also noted in the arrangement of FIG. 4 that a notch or recess 19 is provided in the dispensing edge 26 in a portion immediately below the lamp unit 51 of the photoelectric low toner level sensor. The portion of the edge defining the notch 19 is separated or spaced from the cover and thereby does not deform it. The notch 19 thereby provides a segment of the roll 22 through which a minimum of toner is dispensed. Since the toner unit is located immediately above this notch, a low level signal will not be produced prematurely. Stated differently, the low level sensor is located to respond to the level of the toner in a section of the roll which has the lowest dispensing rate. This ensures that the level at this section is at least as, and most probably lower, than the toner level above any other section of the roll.

The combination of a movable dispensing edge and a tapered contour for the edge results in a degree of control over the dispensing rate not before enjoyed in dispensers of this type.

What is claimed is:

1. In a toner dispenser including a rotatable resilient dispensing member, and an edge in frictional contact with said member to dispense toner, and wherein the rate of toner dispensation from said roll varies as a function of the deformation of said roll by said edge, the improvement comprising;

means for mounting said edge for movement toward and away from said roll wherein the distance between the edge and the axis of said roll varies along said axis and wherein the edge is spaced closer to said axis adjacent both ends of said roll relative to central portion of said roll.

2. The combination recited in claim 1 wherein a toner level sensing arrangement is located above said roll to sense the level of toner in said central portion.

3. The combination recited in claim 2 wherein said toner level sensing arrangement is a photoelectric sensor which generates a light beam directed across said central portion.

4. In a toner dispenser including a hopper adapted to hold a quantity of toner, said hopper having an elongated opening adjacent the bottom thereof and a rotatable cylindrical dispensing roll located in said opening, a low toner level indicator arrangement comprising a light source, a photocell, said light source and photocell mounted in opposed walls of said hopper such that light from said source passes across said hopper at a preselected level above the dispensing roll, the improvement comprising means for controlling the rate of dispensation of toner from said hopper along said opening so that the rate is smallest from the section of said roll directly below said light path across said hopper.

5. The combination recited in claim 4 wherein said dispensing roll comprises a resilient open-cell foam material and said means for varying comprises an edge in frictional contact with said roll along the entire length thereof except for a preselected portion directly below said light path.

6. The combination recited in claim 4 wherein said dispensing roll comprises a resilient roll and said means for varying comprises a dispensing edge which is spaced a smaller distance from the axis of said roll adjacent the ends thereof, then directly below said toner level arrangement.

7. The combination recited in claim 6 wherein said dispensing roll is made of a open-cell foam material.

* * * * *